US011231077B2

(12) United States Patent
Brown (10) Patent No.: US 11,231,077 B2
(45) Date of Patent: Jan. 25, 2022

(54) TORQUE TRANSFER APPARATUS AND METHODS OF USE

(71) Applicants: PEAK WELL SYSTEMS PTY LTD, Bayswater (AU); PEAK WELL SYSTEMS LIMITED, Aberdeen (GB)

(72) Inventor: Gareth Edward George Brown, Ellon (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 723 days.

(21) Appl. No.: 16/066,050

(22) PCT Filed: Dec. 23, 2016

(86) PCT No.: PCT/GB2016/054067
§ 371 (c)(1),
(2) Date: Jun. 25, 2018

(87) PCT Pub. No.: WO2017/109511
PCT Pub. Date: Jun. 29, 2017

(65) Prior Publication Data
US 2019/0368558 A1   Dec. 5, 2019

(30) Foreign Application Priority Data

Dec. 23, 2015 (GB) ..................... 1522725
Dec. 23, 2015 (GB) ..................... 1522751

(51) Int. Cl.
*F16D 49/10* (2006.01)
*F16D 13/16* (2006.01)
(Continued)

(52) U.S. Cl.
CPC ............. *F16D 49/10* (2013.01); *F16D 13/10* (2013.01); *F16D 13/16* (2013.01); *F16D 51/12* (2013.01); *F16D 51/22* (2013.01); *F16D 2125/66* (2013.01)

(58) Field of Classification Search
CPC .......... F16D 13/12; F16D 13/16; F16D 49/10; F16D 51/02; F16D 51/04; F16D 51/12; (Continued)

(56) References Cited

U.S. PATENT DOCUMENTS 9,043 A    6/1852   Wright
758,186 A  4/1904   Mabrey
(Continued)

FOREIGN PATENT DOCUMENTS

CH   295473 A   12/1953
DE   814546 A   9/1951
(Continued)

OTHER PUBLICATIONS

Office Action received in U.S. Appl. No. 16/066,038 dated Feb. 19, 2020, 19 pages.
(Continued)

*Primary Examiner* — Thomas J Williams
(74) *Attorney, Agent, or Firm* — Ashley E. Brown (57) ABSTRACT

A torque transfer apparatus and method of use is described. The apparatus comprises a plurality of elements assembled together to form a ring structure oriented in a plane around a longitudinal axis. The ring structure defines a first engagement surface. A structure defining a second engagement surface is rotatable with respect to the ring structure. The ring structure is operable to be moved between a collapsed condition and an expanded condition by movement of the plurality of elements, and movement between the collapsed condition and the expanded condition engages or disengages
(Continued)

the first and second engagement surfaces. The apparatus can be configured to transfer a driving torque (e.g. a clutch) or a braking force (e.g. a torque brake).

25 Claims, 7 Drawing Sheets (51) Int. Cl.
    *F16D 51/12*     (2006.01)
    *F16D 13/10*     (2006.01)
    *F16D 51/22*     (2006.01)
    *F16D 125/66*     (2012.01)

(58) Field of Classification Search
    CPC ..... F16D 49/08; B65H 75/247; B65H 75/248; B23B 31/16162; B23B 31/16158
    USPC .......................................... 188/136, 336, 76
    See application file for complete search history.

(56) References Cited

U.S. PATENT DOCUMENTS

| | | | |
|---|---|---|---|
| 865,998 A | 9/1907 | Cook | |
| 1,594,259 A * | 7/1926 | Hardman | F16D 13/16 192/76 |
| 1,776,415 A * | 9/1930 | Class | F16D 51/04 188/337 |
| 2,052,846 A * | 9/1936 | Ryba | F16D 49/08 188/164 |
| 2,167,935 A * | 8/1939 | Borden | F16D 65/08 188/336 |
| 2,287,205 A | 6/1942 | Frederick | |
| 2,355,308 A * | 8/1944 | Kurzina, Jr. | B62L 5/006 29/558 |
| 2,609,836 A | 9/1952 | Knox | |
| 2,613,763 A * | 10/1952 | Campbell | B62L 5/08 188/26 |
| 2,701,615 A | 2/1955 | Riordan, Jr. | |
| 3,572,627 A | 3/1971 | Jones | |
| 3,603,411 A | 9/1971 | Link | |
| 3,915,424 A | 10/1975 | LeRouax | |
| 3,937,412 A * | 2/1976 | Damour | B23B 31/305 242/571.1 |
| 4,460,150 A | 7/1984 | Turlak et al. | |
| 4,842,082 A | 6/1989 | Springer | |
| 5,341,888 A | 8/1994 | Deschutter | |
| 5,507,465 A | 4/1996 | Borle | |
| 5,678,635 A | 10/1997 | Dunlap et al. | |
| 5,685,078 A | 11/1997 | Obst et al. | |
| 6,598,672 B2 | 7/2003 | Bell et al. | |
| 7,290,603 B2 | 11/2007 | Hiorth et al. | |
| 7,389,822 B2 | 6/2008 | Lohbeck et al. | |
| 7,921,921 B2 | 4/2011 | Bishop et al. | |
| 7,992,634 B2 | 8/2011 | Angelle et al. | |
| 8,083,001 B2 | 12/2011 | Conner et al. | |
| 8,167,033 B2 | 5/2012 | White | |
| 8,459,344 B1 | 6/2013 | Stone | |
| 8,555,980 B1 | 10/2013 | Powell | |
| 8,733,453 B2 | 5/2014 | Guerrero et al. | |
| 9,038,723 B2 | 5/2015 | Trudeau et al. | |
| 9,051,812 B2 | 6/2015 | Clemens et al. | |
| 9,806,566 B2 | 10/2017 | Nagao et al. | |
| 10,258,361 B2 | 4/2019 | Dickerson et al. | |
| 10,487,614 B2 | 11/2019 | MacDonald | |
| 2010/0071908 A1 | 3/2010 | Bishop et al. | |
| 2011/0061857 A1 | 3/2011 | White | |
| 2011/0127131 A1 | 6/2011 | Simons et al. | |
| 2013/0112398 A1 | 5/2013 | White | |
| 2013/0168076 A1 | 7/2013 | Davis | |
| 2013/0269929 A1 | 10/2013 | Smith | |
| 2013/0319654 A1 | 12/2013 | Hiorth et al. | |
| 2016/0123100 A1 | 5/2016 | Tse | |
| 2019/0264547 A1 | 8/2019 | Cornelissen | |

FOREIGN PATENT DOCUMENTS

| | | | | |
|---|---|---|---|---|
| DE | 1775899 A1 | 10/1971 | | |
| EP | 0533326 A1 | 3/1993 | | |
| FR | 2996816 A1 | 4/2014 | | |
| GB | 191010637 A | 3/1911 | | |
| GB | 601308 A * | 5/1948 | ............ | C08G 14/10 |
| GB | 1452272 A | 10/1976 | | |
| GB | 1484814 A * | 9/1977 | ....... | B23B 31/16158 |
| GB | 2097491 A * | 11/1982 | ............ | F16D 13/26 |
| GB | 2127068 A | 4/1984 | | |
| GB | 2488152 A | 8/2012 | | |
| JP | S643330 A1 | 1/1989 | | |
| JP | 2000120365 A | 4/2000 | | |
| WO | 2017109506 A2 | 6/2017 | | |
| WO | 2017109508 A1 | 6/2017 | | |
| WO | 2017109509 A1 | 6/2017 | | |
| WO | 2017109510 A1 | 6/2017 | | |
| WO | 2017109511 A1 | 6/2017 | | |

OTHER PUBLICATIONS

Office Action received in U.S. Appl. No. 16/066,044 dated Feb. 20, 2020, 19 pages.
Office Action received in U.S. Appl. No. 16/066,046 dated Mar. 2, 2020, 18 pages.
Office Action received in U.S. Appl. No. 16/066,049 dated Mar. 16, 2020, 15 pages.
International Search and Written Opinion issued in the related PCT Application PCT/GB2016/054064, dated May 8, 2017 (11 pages).
International Preliminary Report on Patentability issued in the related PCT Application PCT/GB2016/054064, dated Jun. 26, 2018 (7 pages).
Combined Search and Examination Report issued in the related GB Application 1622148.3, dated Jun. 21, 2017 (9 pages).
Examination Report issued in the related GB Application 1622148.3, dated Jul. 24, 2019 (4 pages).
International Search and Written Opinion issued in the related PCT Application PCT/GB2016/054065, dated May 8, 2017 (10 pages).
International Preliminary Report on Patentability issued in the related PCT Application PCT/GB2016/054065, dated Jun. 26, 2018 (6 pages).
Combined Search and Examination Report issued in the related GB Application 1622150.9, dated Mar. 31, 2017 (5 pages).
International Search and Written Opinion issued in the related PCT Application PCT/GB2016/054066, dated May 8, 2017 (9 pages).
International Preliminary Report on Patentability issued in the related PCT Application PCT/GB2016/054066, dated Jun. 26, 2018 (6 pages).
Combined Search and Examination Report issued in the related GB Application 1622151.9, dated Apr. 27, 2017 (5 pages).
Examination Report issued in the related GB Application 1622151.9, dated Jan. 24, 2019 (3 pages).
International Search and Written Opinion issued in the related PCT Application PCT/GB2016/054067, dated May 8, 2017 (11 pages).
International Preliminary Report on Patentability issued in the related PCT Application PCT/GB2016/054067, dated Jun. 26, 2018 (7 pages).
Combined Search and Examination Report issued in the related GB Application 1622152.5, dated Apr. 27, 2017 (7 pages).
International Search and Written Opinion issued in the related PCT Application PCT/GB2016/054058, dated Jun. 21, 2017 (12 pages).
International Preliminary Report on Patentability issued in the related PCT Application PCT/GB2016/054058, dated Jun. 26, 2018 (8 pages).
Combined Search and Examination Report issued in the related GB Application 1622147.5, dated Apr. 27, 2017 (7 pages).
Examination Report issued in the related GB Application 1622147.5, dated Jan. 31, 2019 (2 pages).
First Examination Report issued in Australian Patent Application No. 2016376009 dated Jun. 10, 2021, 4 pages.

* cited by examiner

TORQUE TRANSFER APPARATUS AND METHODS OF USE

This application is the U.S. National Stage of International Application No. PCT/GB2016/054067, filed Dec. 23, 2016. This application also claims the benefit of GB patent application No. 1522751.5, and GB patent application No. 1522725.9 filed Dec. 23, 2015, the contents of which are hereby incorporated by reference in their entirety.

The present invention relates to a torque transfer apparatus and methods of use, and in particular aspects, to a torque transfer apparatus comprising a ring, operable to move between a collapsed condition and an expanded condition.

BACKGROUND TO THE INVENTION

In many fields of mechanical engineering, a clutch is a device which is engaged or disengaged to enable selective transmission of torque between rotary components. A torque brake is a device which is engaged or disengaged to prevent or slow relative rotation between components.

SUMMARY OF THE INVENTION

It is amongst the claims and objects of the invention to provide torque transfer apparatus, such as a clutch or a torque brake, and methods of use which obviate or mitigate disadvantages of previously proposed torque transfer apparatus.

Further aims and objects of the invention will be apparent from reading the following description.

According to a first aspect of the invention, there is provided a torque transfer apparatus comprising:
- a plurality of elements assembled together to form a ring structure oriented in a plane around a longitudinal axis and defining a first engagement surface;
- a structure defining a second engagement surface, wherein the structure is rotatable with respect to the ring structure;
- wherein the ring structure is operable to be moved between a collapsed condition and an expanded condition by movement of the plurality of elements on imparting or releasing an axial force, and wherein movement between the collapsed condition and the expanded condition engages or disengages the first and second engagement surfaces.

The torque transfer apparatus may be a clutch, and therefore the first and second engagement surfaces may be engaged to transfer a driving torque between the ring structure and the rotatable member.

Alternatively, on in addition, the torque transfer apparatus may be a brake, and therefore the first and second engagement surfaces may be engaged to transfer a braking torque therebetween.

The collapsed condition may be a first condition of the apparatus, and the expanded condition may be a second condition of the apparatus. Thus the apparatus may be normally collapsed, and may be actuated to be expanded. Alternatively, the expanded condition may be a first condition of the apparatus, and the collapsed condition may be a second condition of the apparatus. Thus the apparatus may be normally expanded, and may be actuated to be collapsed.

The plane of the ring structure may be perpendicular to the longitudinal axis. The ring structure, and its plane of orientation, may be operable to move on the apparatus during expansion and/or collapsing. The movement of the plane may be an axial sliding movement, during expanding and/or collapsing of the ring structure.

The first engagement surface may be parallel to the longitudinal axis of the apparatus. Alternatively, or in addition, the first engagement surface may be inclined to the longitudinal axis of the apparatus, and may for example be a conical surface.

The first engagement surface may be an inner surface of the ring structure, and may be a substantially cylindrical surface. The ring surface may be arranged to contact or otherwise interact with an inner surface of a tubular or cylinder.

In the collapsed condition, the elements may be arranged generally at collapsed radial positions, and may define a collapsed outer diameter and inner diameter of the ring structure.

In the expanded condition, the elements may be arranged generally at expanded radial positions, and may define an expanded outer diameter and inner diameter of the ring structure. The ring surface may be located at or on the expanded outer diameter of the ring structure, or may be located at or on the collapsed inner diameter of the ring structure.

In the collapsed condition, the elements may occupy a collapsed annular volume, and in the expanded condition the elements may occupy an expanded annular volume. The collapsed annular volume and the expanded annular volume may be discrete and separated volumes, or the volumes may partially overlap.

The elements may be configured to move between their expanded and collapsed radial positions in a path which is tangential to a circle described around and concentric with the longitudinal axis.

Preferably, each element of the ring structure comprises a first contact surface and second contact surface respectively in abutment with first and second adjacent elements. The elements may be configured to slide relative to one another along their respective contact surfaces.

The first contact surface and/or the second contact surface may be oriented tangentially to a circle described around and concentric with the longitudinal axis. The first contact surface and the second contact surface are preferably non-parallel. The first contact surface and the second contact surface may converge towards one another in a direction towards an inner surface of the ring structure (and may therefore diverge away from one another in a direction away from an inner surface of the ring structure).

At least some of the elements are preferably provided with interlocking profiles for interlocking with an adjacent element. Preferably the interlocking profiles are formed in the first and/or second contact surfaces. Preferably, an element is configured to interlock with a contact surface of an adjacent element. Such interlocking may prevent or restrict separation of assembled adjacent elements in a circumferential and/or radial direction of the ring structure, while enabling relative sliding movement of adjacent elements.

Preferably, at least some of, and more preferably all of, the elements assembled to form a ring are identical to one another, and each comprises an interlocking profile which is configured to interlock with a corresponding interlocking profile on another element. The interlocking profiles may comprise at least one recess such as groove, and at least one protrusion, such as a tongue or a pin, configured to be received in the groove. The interlocking profiles may comprise at least one dovetail recess and dovetail protrusion.

The first and second contact surfaces of an element may be oriented on first and second planes, which may intersect an inner surface of the ring at first and second intersection lines, such that a sector of an imaginary cylinder is defined between the longitudinal axis and the intersection lines. The central angle of the sector may be 45 degrees or less. Such a configuration corresponds to eight or more elements assembled together to form the ring structure.

Preferably, the central angle of the sector is 30 degrees or less, corresponding to twelve or more elements assembled together to form the ring. More preferably, the central angle of the sector is in the range of 10 degrees to 20 degrees, corresponding to eighteen to thirty-six elements assembled together to form the ring. In a particular preferred embodiment, the central angle of the sector is 15 degrees, corresponding to twenty-four elements assembled together to form the ring structure.

Preferably, an angle described between the first contact and second contact surfaces corresponds to the central angle of the sector. Preferably therefore, an angle described between the first contact and second contact surfaces is in the range of 10 degrees to 20 degrees, and in a particular preferred embodiment, the angle described between the first contact and second contact surfaces is 15 degrees, corresponding to twenty-four elements assembled together to form the ring structure.

In a preferred embodiment, the apparatus comprises a support surface for the ring structure. The support surface may be the outer surface of a mandrel or tubular. The support surface may support the ring structure in a collapsed condition of the apparatus.

The support surface may be the inner surface of a mandrel or tubular. The support surface may support the ring structure in an expanded condition of the apparatus.

In some embodiments, the apparatus is operated in its expanded condition, and in other embodiments, the apparatus is operated in its collapsed condition. Preferably, elements forming the ring structure are mutually supportive in an operating condition of the apparatus. Where the operating condition of the apparatus its expanded condition (i.e. when the apparatus is operated in its expanded condition), the ring structure is preferably a substantially solid ring structure in its expanded condition, and the elements may be fully mutually supported.

The apparatus may comprise a formation configured to impart a radial expanding or collapsing force component to the elements of a ring structure from an axial actuation force. The apparatus may comprise a pair of formations configured to impart a radial expanding or collapsing force component to the elements of a ring structure from an axial actuation force. The formation (or formations) may comprise a wedge or wedge profile, and may comprise a cone wedge or wedge profile.

Preferably the formation (or formations) are configured to transmit torque to the ring structure. The formation (or formations) may comprise a splined arrangement.

The apparatus may comprise a biasing means, which may be configured to bias the ring structure to its collapsed condition. The biasing means may comprise a circumferential spring, a garter spring, or a spiral retaining ring. The biasing means may be arranged around an outer surface of a ring structure, to bias it towards a collapsed condition. The biasing means may be arranged around an inner surface of a ring structure, to bias it towards an expanded condition. One or more elements may comprise a formation such as a groove for receiving the biasing means. Preferably, grooves in the elements combine to form a circumferential groove in the ring structure. Multiple biasing means may be provided on the ring structure.

According to a second aspect of the invention, there is provided a torque transfer apparatus comprising:
  a plurality of elements assembled together to form a ring structure oriented in a plane around a longitudinal axis and defining a first engagement surface;
  a structure defining a second engagement surface, wherein the structure is rotatable with respect to the ring structure;
  wherein the first engagement surface is a cylindrical surface;
  and wherein ring structure is operable to be moved between first and second conditions to engage or disengage the first and second engagement surfaces.

The torque transfer apparatus may be a clutch, and therefore the first and second engagement surfaces may be engaged to transfer a driving torque between the ring structure and the rotatable member.

Alternatively, on in addition, the torque transfer apparatus may be a brake, and therefore the first and second engagement surfaces may be engaged to transfer a braking torque therebetween.

Embodiments of the second aspect of the invention may include one or more features of the first aspect of the invention or its embodiments, or vice versa.

According to a third aspect of the invention, there is provided a method of transferring torque between engagement surfaces using the apparatus of the first or second aspects of the invention.

Embodiments of the third aspect of the invention may include one or more features of the first or second aspects of the invention or their embodiments, or vice versa.

According to a fourth aspect of the invention, there is provided a method of transferring a driving torque between engagement surfaces using the apparatus of the first or second aspects of the invention.

Embodiments of the fourth aspect of the invention may include one or more features of the first or second aspects of the invention or their embodiments, or vice versa.

According to a fifth aspect of the invention, there is provided a method of transferring a braking torque between engagement surfaces using the apparatus of the first or second aspects of the invention.

Embodiments of the fifth aspect of the invention may include one or more features of the first or second aspects of the invention or their embodiments, or vice versa.

According to a further aspect of the invention, there is provided a torque transfer apparatus comprising:
  a plurality of elements assembled together to form a ring structure oriented in a plane around a longitudinal axis and defining a first engagement surface;
  a structure defining a second engagement surface, wherein the structure is rotatable with respect to the ring structure;
  wherein the ring structure is operable to be moved between a collapsed condition and an expanded condition by movement of the plurality of elements on imparting or releasing a force, and wherein movement between the collapsed condition and the expanded condition engages or disengages the first and second engagement surfaces.

Embodiments of the further aspect of the invention may include one or more features of the first or second aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Referring firstly to FIGS. 1A to 4F, the principles of the invention will be described with reference to an expanding apparatus which is useful for understanding the invention and its embodiments. In the arrangement of FIGS. 1A to 4F, the expanding apparatus, generally depicted at 10, comprises an expanding ring structure configured to be expanded from a first collapsed or unexpanded condition (shown in FIGS. 1A to 1D) and a second expanded condition (shown in FIGS. 2A to 2D). The apparatus of this and other embodiments may be referred to as "expanding apparatus" for convenience, as they are operable to move to an expanded state from a normal collapsed state. However, the apparatus may equally be referred to as a collapsing apparatus, or an expanding or collapsing apparatus, as they are capable of being expanded or collapsed depending on operational state.

The expanding apparatus 10 comprises a plurality of elements 12 assembled together to form a ring structure 11. The elements 12 define an inner ring surface which is supported by the outer surface of cylinder 14. Each element comprises an inner surface 20, an outer surface 21 and first and second contact surfaces 22, 23. The first and second contact surfaces are oriented in non-parallel planes, which are tangential to a circle centred on the longitudinal axis of the apparatus. The planes converge towards the inner surface of the element. Therefore, each element is in the general form of a wedge, and the wedges are assembled together in a circumferentially overlapping fashion to form the ring structure 11. In use, the first and second contact surfaces of adjacent elements are mutually supportive.

Figure 3A:
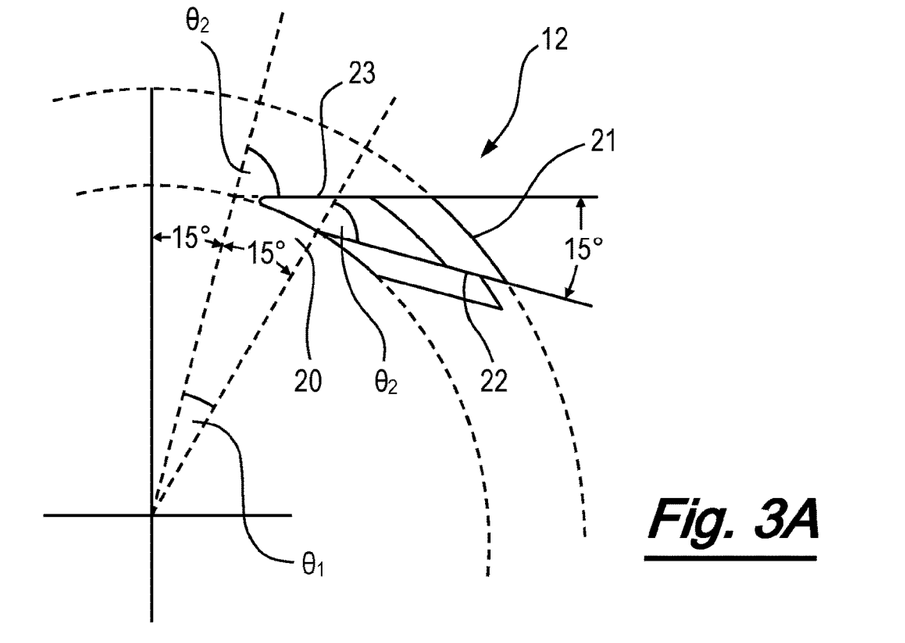
FIGS. 3A and 3B are geometric representations of an element of the apparatus of FIGS. 1A and 1D, shown from one side.
Figure 3B:
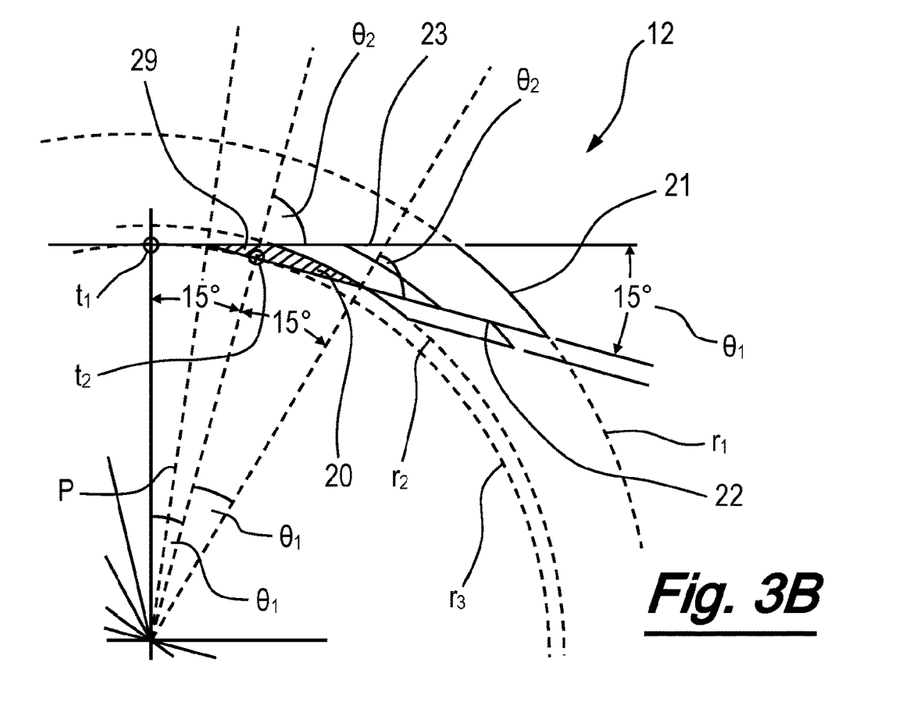
Figure 4A:
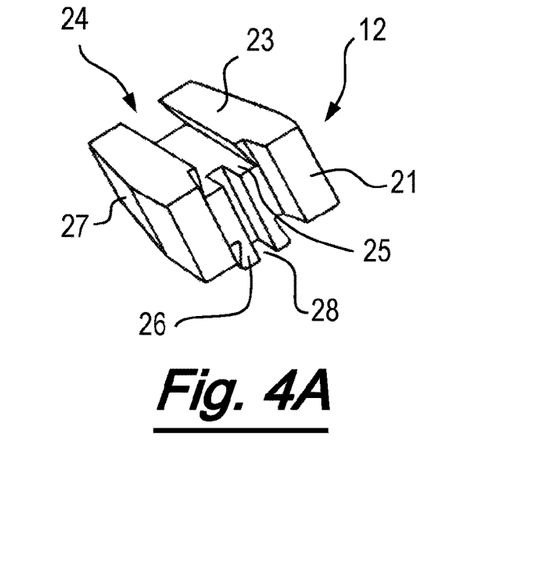
FIG. 4A to FIG. 4F are respectively first perspective, second perspective, plan, first end, lower, and second end views of an element of the apparatus of FIGS. 1A to 1D.
Figure 4B:
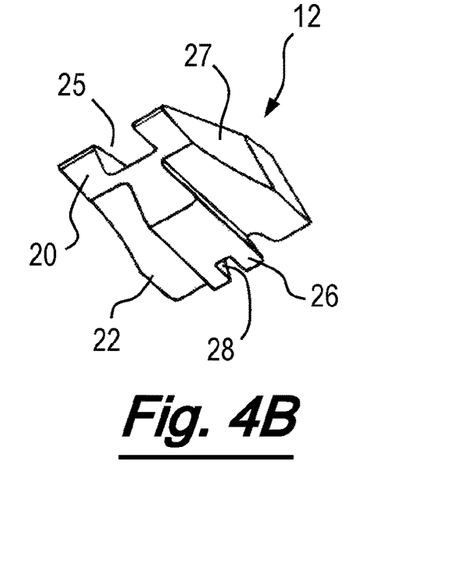
Figure 4C:
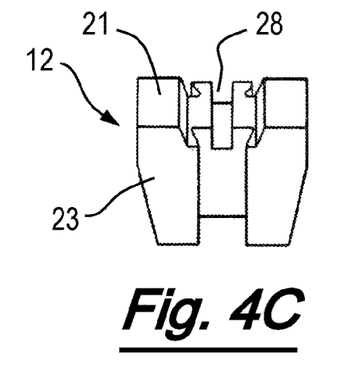
Figure 4D:
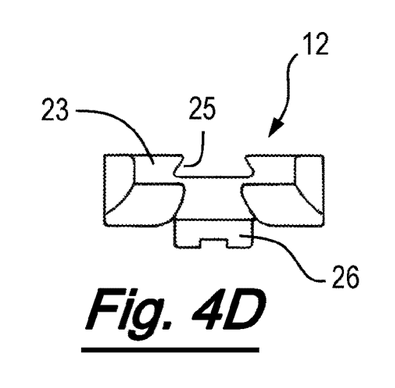
Figure 4E:
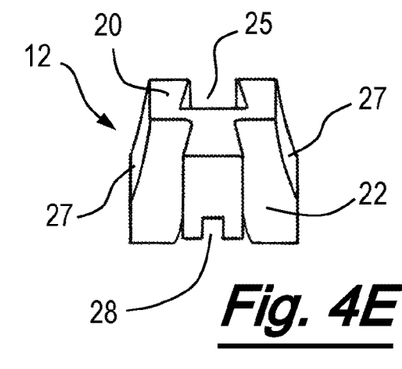
Figure 4F:
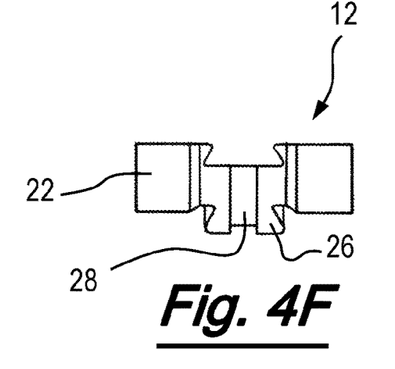

As shown in FIG. 3B, each element is based on a notional wedge-shaped segment of a ring centred on an axis, with each notional wedge-shaped segment being inclined with respect to the radial direction of the ring. The nominal outer diameter of the segment is at the optimum expansion condition of the ring (with radius shown at $r_1$).

The orientation planes of the first and second contact surfaces of the element are tangential to a circle with radius $r_3$ concentric with the ring at points $t_1$, $t_2$. The angle described between the tangent points is equal to the angle $\theta_1$ of the segment. The orientation planes of the first and second contact surfaces of each notional wedge-shaped segment intersect one another on a radial plane P which bisects radial planes located at the tangent points (i.e. is at an angle of $\theta_1/2$ to both). This intersection plane P defines the expanding and collapsing path of the segment.

Figures 1A, 1B, 1C, 1D:
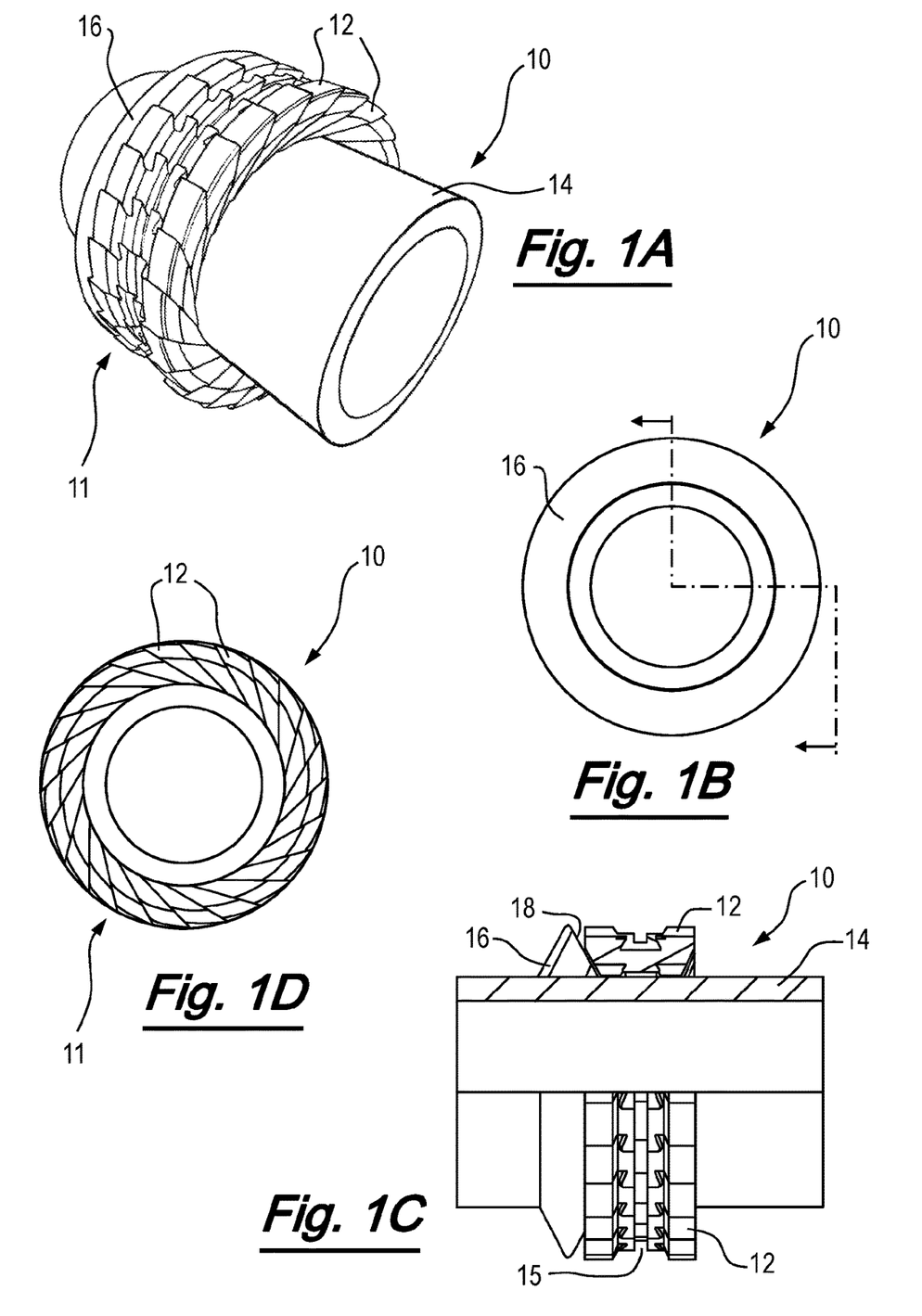
FIG. 1A to FIG. 1D are respectively perspective, first end, part sectional and second end views of an apparatus useful for understanding the invention, shown in a collapsed condition.
Figures 2A, 2B, 2C, 2D:
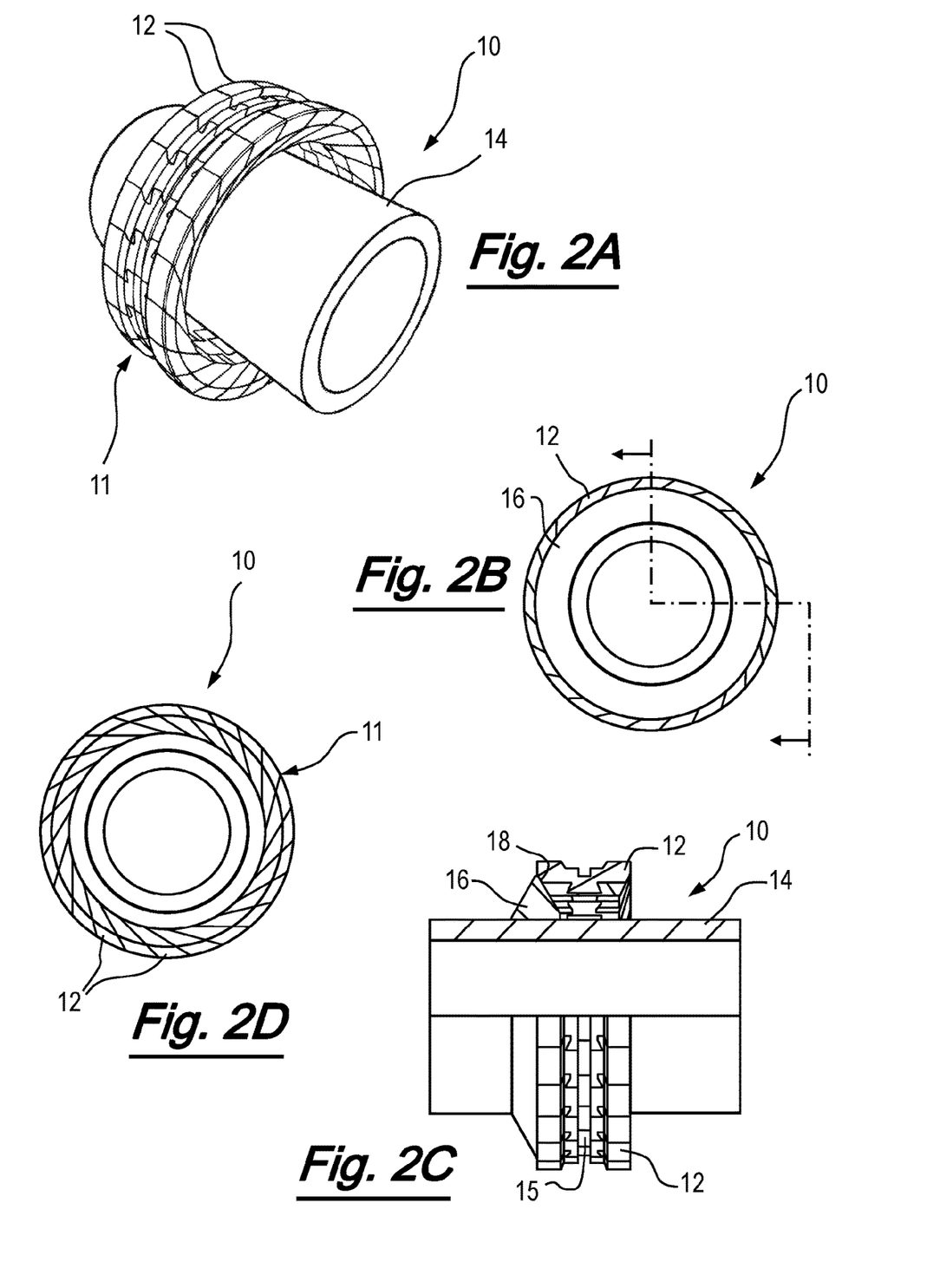
FIGS. 2A to 2D are respectively perspective, first side, part sectional and second side views of the apparatus of FIGS. 1A to 1D, shown in an expanded condition.

In the configuration shown in FIGS. 1 and 2, notional wedge-shaped segments are modified by removal of the tips 29 of the wedges, to provide a curved or arced inner surface 20 with radius $r_2$ when the ring is in its expanded condition shown in FIGS. 2A and 2D. The modification of the wedge-shaped elements can be thought of as an increase in diameter of an internal bore through the ring structure by $2(r_2-r_3)$, or a truncation of the inner diameter. This change in the inner diameter from the notional inner diameter $r_3$ to which the contact surfaces are tangential to a truncated inner diameter $r_2$, has the effect of changing an angle between the contact surfaces and the radial plane from the centre of the ring. Taking angle $\theta_2$ to be the angle described between the contact surface and a radial plane defined between the centre point of the ring structure and the point at which the orientation surface meets or intersects a circle at the radial position of the inner surface, $\theta_2$ is changed in dependence on the amount by which the segment has its inner diameter truncated. For the notional wedge shaped segment, the orientation planes of the contact surfaces are tangential to a circle at the inner diameter at $r_3$ (i.e. angle $\theta_2$ is 90 degrees). For the modified elements 12, the orientation planes of the contact surfaces instead intersect a circle at the (increased) inner diameter at $r_2$ and are inclined at a reduced angle $\theta_2$.

The angle $\theta_2$ at which the segment is inclined is related to the amount of material removed from the notional wedge-shaped segment, but is independent from the central angle $\theta_1$ of the wedge. Angle $\theta_2$ is selected to provide element dimensions suitable for manufacture, robustness, and fit within the desired annular volume and inner and outer diameters of the collapsed ring. As the angle $\theta_2$ approaches 90 degrees, a shallower, finer wedge profile is created by the element, which may enable optimisation of the collapsed volume of the ring structure. Although a shallower, finer wedge profile may have the effect of reducing the size of the gaps created at the inner surface of the ring in the collapsed condition and/or enabling a more compact collapsed condition, there are some consequences. These include the introduction of flat sections at the inner surfaces of the elements, which manifest as spaces at the inner diameter of the ring when in an expanded or partially expanded condition. When $\theta_2=90$ degrees, all the segments are purely tangential to inner diameter, the collapsed volume for a given outer diameter and inner diameter is most efficient, but the inner surface of the ring structure is polygonal with flat sections created by each segment. In some configurations, these flat sections may be undesirable. There may also be potential difficulties with manufacture of the elements and robustness of the elements and assembled ring structure. However, in many applications, where the profile of the inner surface of the expanded ring is not critical, for example when the inner diameter of the ring structure is floating, and/or the true inner diameter is defined by an actuation wedge profile rather than the inner surface of the ring, this compromise may not be detrimental to the operation of the apparatus, and the reduced collapse volume may justify an inclination angle $\theta_2$ of (or approaching) 90 degrees.

In the apparatus of FIGS. 1 to 4, the angle $\theta_2$ is 75 degrees. Relaxing $\theta_2$ to a reduced angle provides a smooth outer diameter and inner diameter profile to the expanded ring, as a portion of the inner circular arc is retained at the expense of slightly increased collapsed volume. It should be noted that the angle $\theta_2$ is independent from the angle $\theta_1$. Where the ring structure is desired to have a circular inner surface, preferred arrangements may have an angle $\theta_2$ which is in the range of (90 degrees-$2\theta_1$) to 90 degrees inclusive, and particularly preferred arrangements have an angle $\theta_2$ in the range of 70 degrees to 90 degrees (most preferably in the range of 73 degrees to 90 degrees). In general, to provide sufficient truncation of the inner diameter to retain a useful portion of an inner arc and provide a smooth inner surface to the ring structure, a maximum useful value of $\theta_2$ is (90 degrees-$\theta_1$/2). This would be 82.5 degrees in the described arrangements.

In other configurations, also in accordance with embodiments of the invention (and as will be described below) the geometry of the notional wedge-shaped segments forming the elements may be unmodified (save for the provision of functional formations such as for interlocking and/or retention of the elements), without the removal of material from the tip of the notional wedge-shaped segments. Such embodiments may be preferred when there is no requirement for the ring structure to have a circular inner surface.

As most clearly shown in FIGS. 4A to 4F, the first and second contact surfaces of the element have corresponding interlocking profiles 24 formed therein, such that adjacent elements can interlock with one another. In this case, the interlocking profiles comprise a dovetail groove 25 and a corresponding dovetail tongue 26. The interlocking profiles resist circumferential and/or radial separation of the elements in the ring structure, but permit relative sliding motion between adjacent elements. The interlocking profiles also facilitate smooth and uniform expansion and contraction of the elements during use. It will be appreciated that alternative forms of interlocking profiles, for example comprising recesses and protrusions of other shapes and forms, may be used within the scope of the invention.

The elements are also provided with inclined side wall portions 27, which facilitate deployment of the apparatus in use. The side wall portions are formed in an inverted cone shape which corresponds to the shape and curvature of the actuating cone wedges profiles when the apparatus is in its maximum load condition (typically at its optimum expansion condition).

Each element is also provided with a groove 28, and in the assembled ring structure, the grooves are aligned to provide a circular groove which extends around the ring. The groove accommodates a biasing element (not shown), for example a spiral retaining ring of the type marketed by Smalley Steel Ring Company under the Spirolox brand, or a garter spring. In this case, the biasing means is located around the outer surface of the elements, to bias the apparatus towards the collapsed condition shown in FIGS. 1A to 1D. Although one groove for accommodating a biasing means is provided in this embodiment, in alternative embodiments of the apparatus, multiple grooves and biasing means may be provided.

The apparatus 10 comprises a wedge member 16, which in this case is an annular ring having a conical surface 18 opposing one side of the ring structure 11. The wedge angle corresponds with the angle of the inclined conical side walls 27 of the elements. A corresponding wedge shaped profile (not shown) is optionally provided on the opposing side of the ring structure to facilitate expansion of the ring elements.

In alternative embodiments of the invention this optional additional wedge may be substituted with an abutment shoulder.

Operation of the expansion apparatus will now be described. In the first, collapsed or unexpanded condition, shown most clearly in FIG. 10, the elements are assembled in a ring structure 11 which extends to a first outer diameter. In this embodiment, and as shown in FIGS. 1B and 10, the wedge member 16 defines the maximum outer diameter of the apparatus in the first condition. The elements are biased towards the unexpanded condition by a spiral retaining ring (not shown), and are supported on the inner surface by the outer surface of the cylinder 14.

In use, an axial actuation force is imparted on the wedge member 16. Any of a number of suitable means known in the art can be used for application of the axial actuation force, for example, the application of a force from an outer sleeve positioned around the cylinder. The force causes the wedge member 16 to move axially with respect to the cylinder, and transfer a component of the axial force onto the recessed side wall of the elements. The angle of the wedge transfers a radial force component to the elements 12, which causes them to slide with respect to one another along their respective contact surfaces.

The movement of the expanding elements is tangential to a circle defined around the longitudinal axis of the apparatus. The contact surfaces of the elements mutually support one another before, during, and after expansion. The radial position of the elements increases on continued application of the axial actuation force until the elements are located at a desired outer radial position. This radial position may be defined by a controlled and limited axial displacement of the wedge member, or alternatively can be determined by an inner surface of a bore or tubular in which the apparatus is disposed.

FIGS. 2A to 2D show clearly the apparatus in its expanded condition. At an optimal expansion condition, shown in FIGS. 2B and 2D, the outer surfaces of the individual elements combine to form a complete circle with no gaps in between the individual elements. The outer surface of the expansion apparatus can be optimised for a specific diameter, to form a perfectly round expanded ring (within manufacturing tolerances) with no extrusion gaps on the inner or outer surfaces of the ring structure. The design of the expansion apparatus also has the benefit that a degree of under expansion or over expansion (for example, to a slightly different radial position) does not introduce significantly large gaps.

It is a feature of the invention that the elements are mutually supported before, throughout, and after the expansion, and do not create gaps between the individual elements during expansion or at the fully expanded position. In addition, the arrangement of elements in a circumferential ring, and their movement in a plane perpendicular to the longitudinal axis, facilitates the provision of smooth side faces or flanks on the expanded ring structure. With deployment of the elements in the plane of the ring structure, the overall width of the ring structure does not change. This enables use of the apparatus in close axial proximity to other functional elements.

The apparatus has a range of applications, and the intervention extend the principles described above to a torque transfer apparatus, such as a clutch, a freewheel, or a brake.

Referring now to FIG. 5A to FIG. 6D, there will be described a clutch apparatus according to an embodiment of the invention. The clutch apparatus, generally depicted at 50, is shown in FIG. 5A to FIG. 5D in a collapsed, disengaged condition, respectively in first perspective cut away, longitudinal sectional, end cut away, and second perspective cut away views. FIG. 6A to FIG. 6D are equivalent views of the clutch apparatus 50 in an expanded, engaged condition.

The apparatus comprises an input drive shaft 52, an output drive shaft 54 which is unitarily formed with a clutch housing 56, and an actuation sleeve 58. Disposed in an annular space 59 between the input drive shaft 52 and the clutch housing 56 is an expanding and collapsing apparatus, generally shown at 60. The expanding and collapsing apparatus 60 is in the form of a ring structure, assembled from a plurality of elements 62.

The elements 62 are similar to the elements 12, and their form and function will be understood from FIGS. 1 to 4 and the accompanying description. In particular, the elements 60 comprise inner and outer surfaces and first and second contact surfaces.

The first and second contact surfaces are oriented in non-parallel planes, which are tangential to a circle centred on the longitudinal axis of the apparatus and concentric with the ring structure. The elements 60 also comprise corresponding interlocking profiles. The elements 60 comprise a pair of grooves 65 for accommodating a pair of biasing springs (not shown).

Located on the input drive shaft at a first end 66 of the ring structure 60 is an engaging formation in the form of a slotted conical wedge profile 68. The wedge profile defines a wedge surface which faces a first end of the ring structure, and interacts with the ring structure to expand and collapse the structure as will be described below. Slots 70 in the conical wedge profile, most clearly visible in FIG. 5A, correspond with ridges 72 formed in the inner surfaces of the elements 62 to form a splined coupling.

Figure 5A:
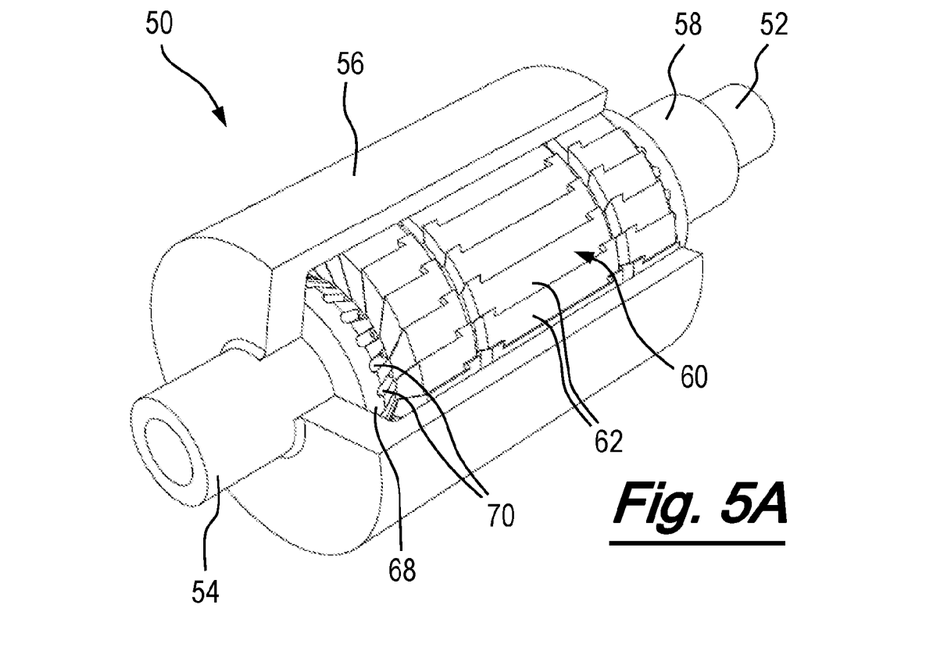
FIG. 5A to FIG. 5D are respectively first cut away perspective, longitudinal sectional, end cut away, and second cut away perspective views of an apparatus according to an embodiment of the invention in a disengaged condition.

The actuation sleeve 58 is rotationally keyed with the input drive shaft 52, by sliding pin 74. The sleeve 58 is able to slide with respect to the input drive shaft on application and/or release of an axial force, but is driven to rotate with the input drive shaft. A first end of the actuation sleeve defines a slotted conical wedge profile 76, which interacts with a second end of the ring structure 78 to expand and collapse the ring structure as will be described below. Slots (not shown) in the conical wedge profile 76 correspond with ridges 80 formed in the inner surfaces of the elements 62 to form a splined coupling In this embodiment, the ring structure 60 is optimised to have an outer diameter which corresponds to the inner diameter of the clutch housing 56. The surface of the ring structure is designed to engage the inner surface of the clutch housing to transfer torque from the ring structure to the clutch housing and drive rotation of the clutch housing and output shaft 54. The clutch housing, or at least its inner surface, and/or the outer surfaces of the elements, are formed from materials which are suitable for frictional engagement of the respective surfaces. Alternatively, or in addition, the inner surface and/or the outer surfaces of the elements are treated and/or coated with a material suitable for frictional engagement.

Operation of the clutch apparatus will now be described, with particular reference to FIGS. 5B and 6B. When the ring structure 60 is in its collapsed condition, shown in FIG. 5B, the outer surface of the ring structure is radially spaced from the inner surface of the clutch housing and the clutch is disengaged. The ring structure 60 is engaged with the conical wedge profiles 68, 76 via the arrangement of splines, and when the drive shaft 52 is driven to rotate, the ring structure rotates with respect to the clutch housing.

When the clutch is required to be engaged, an axial force is imparted between the shaft 52 and the actuation sleeve 58 which brings the conical wedge profiles closer together, transferring an axial force to the elements of the ring structure 60. As previously described with reference to FIGS. 1 to 4, the elements slide with respect to one another in a tangential direction of a circle concentric with the ring, and move to their radially extended positions. The outer surface of the ring structure 60 is moved to its expanded condition and into contact with the inner surface of the clutch housing, as shown in FIG. 6B. Frictional contact between the respective surfaces cause torque from the ring structure to be transmitted to the clutch housing 56, to drive rotation of the output shaft 54.

Due to the physical relationship between the elements, depending on the direction of rotation, the planar contact surfaces inclined towards or away from a counter rotating inner surface. The application of torque through the elements encourages them to either bite into the inner surface of the clutch housing (when the planar contact surfaces are inclined towards the "oncoming" inner surface; anti-clockwise rotation of the ring structure in FIG. 6C) or collapse/slip in the opposite direction (when the planar contact surfaces are inclined away from the "oncoming" inner surface; clockwise rotation of the ring structure in FIG. 6C).

Figure 5B:
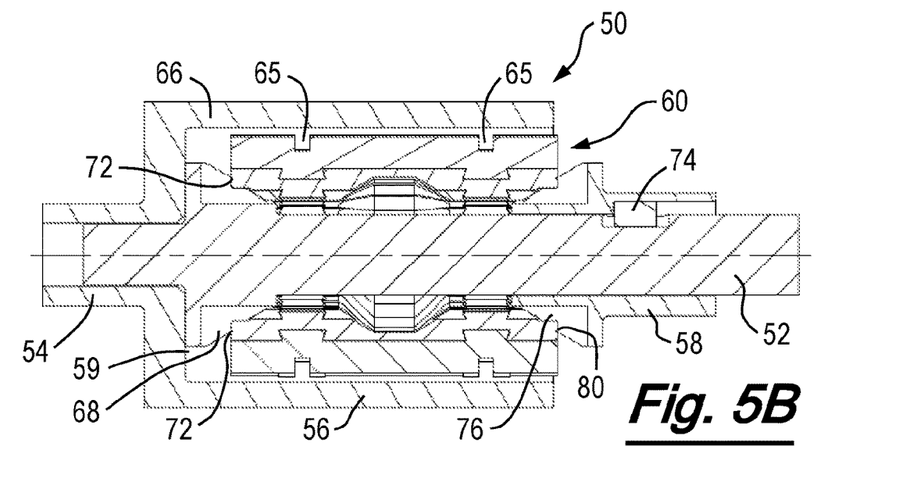
Figure 5C:
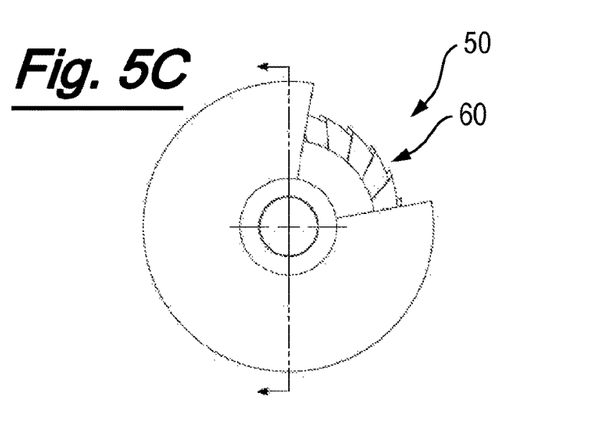
Figure 5D:
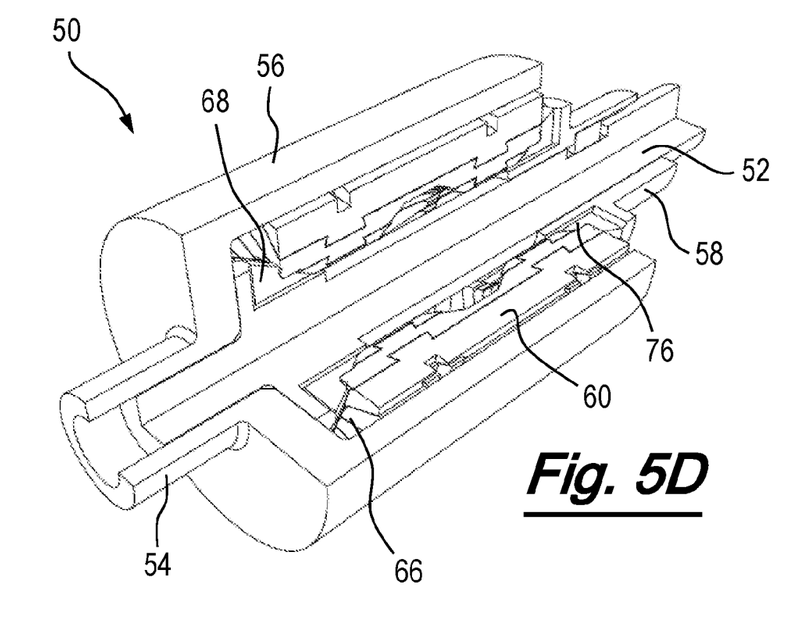
Figure 6A:
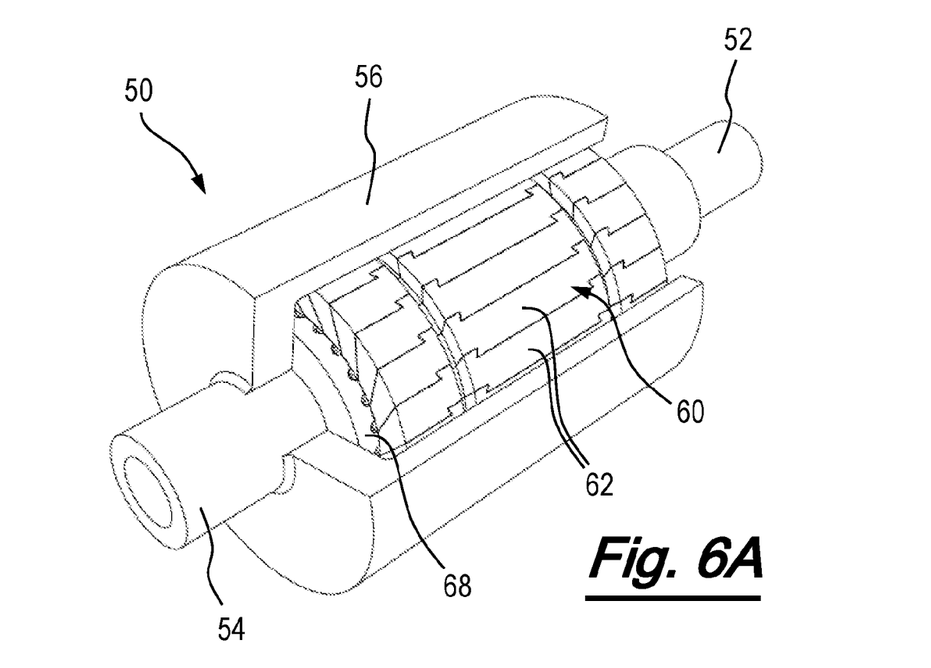
FIGS. 6A to 6D are respectively first cut away perspective, longitudinal sectional, end cut away, and second cut away perspective views of the apparatus of FIG. 5A to FIG. 5D in an engagement condition.
Figure 6B:
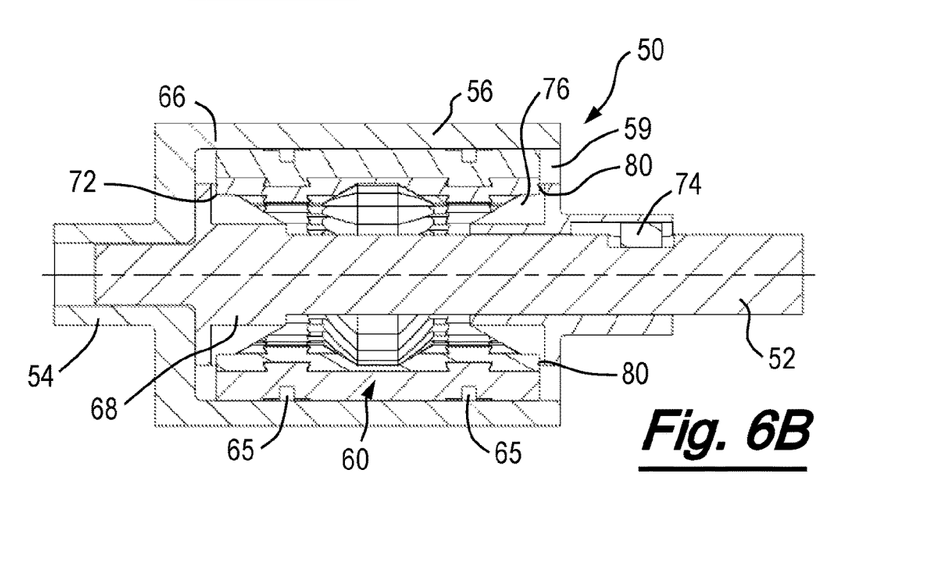
Figure 6C:
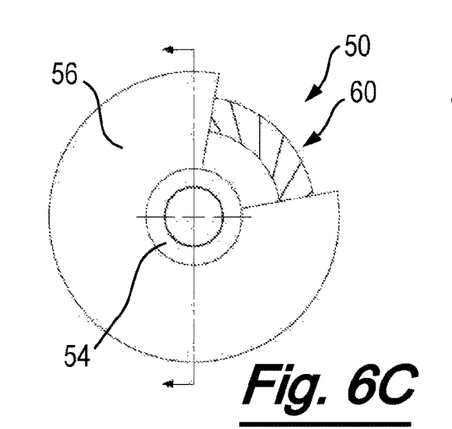
Figure 6D:
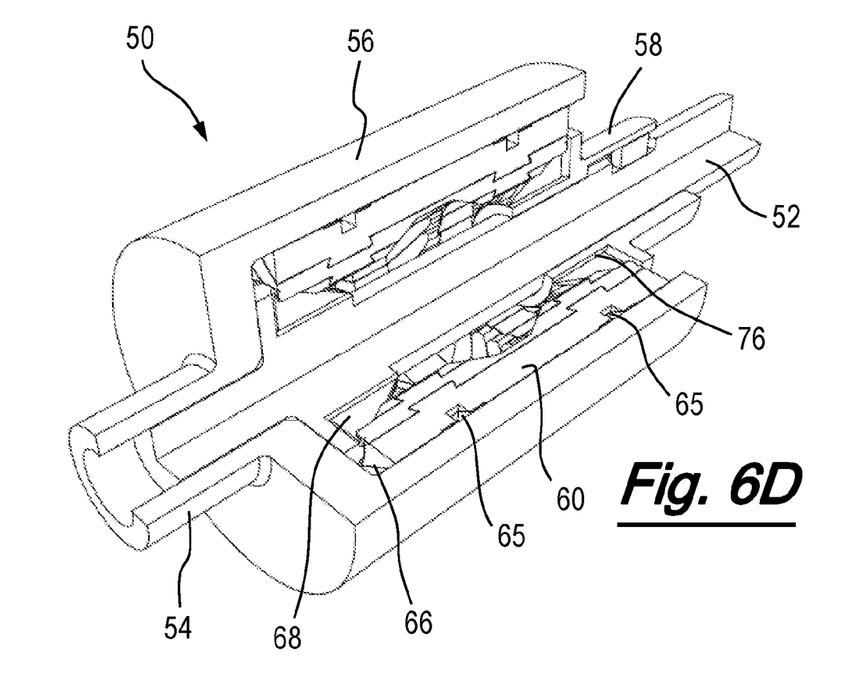

Releasing the axial force separates the wedge profiles and causes the ring structure to collapse under the force of the retaining circumferential springs, disengaging the clutch and returning it to its collapsed condition, shown in FIG. 5B.

In this embodiment, the actuation sleeve and wedge profiles have two positions enabling the device to be positively engaged and disengaged, as per an automotive vehicle clutch. However, in alternative embodiments, the actuation sleeve and wedge profiles may be biased to a normally engaged position, as per a bicycle freewheel.

In an unillustrated embodiment of the invention, the apparatus is biased to a normally expanded engaged position, by providing biasing means (for example in the form of one of more circumferential springs) on the inner diameter of the ring structure. The wedge profiles for expanding and/or collapsing movement of the ring structure are similarly inverted, to provide inverted conical wedges with splined coupling to the outer surface of the elements. Axial actuation of the wedge profiles causes the ring structure to collapse against the force of the biasing means to a disengaged condition. The apparatus can therefore be configured with a fail safe disengaged condition, or a fail-engaged condition. This flexibility of configuration is facilitated by the physical relationship between the elements, which encourages them to either bite into the inner surface of the clutch housing in one direction, or collapse/slip in the opposite direction, as noted above.

Although the invention has been described in the context of a clutch, in which a driven torque is selectively transferred between two rotary components, it will be appreciated that the invention also has application to a torque brake, in which the surfaces are engaged to prevent or slow rotation of a rotating shaft.

The invention provides a torque transfer apparatus and a method of use. The apparatus comprises a plurality of elements assembled together to form a ring structure oriented in a plane around a longitudinal axis and defining a first engagement surface. A structure defines a second engagement surface, and is rotatable with respect to the ring structure. The ring structure is operable to be moved between a collapsed condition and an expanded condition by movement of the plurality of elements, wherein movement between the collapsed condition and the expanded condition engages or disengages the first and second engagement surfaces. The apparatus can be configured to transfer a driving torque (e.g. a clutch) or a braking force (e.g. a torque brake).

An important feature of the apparatus 50 is that at an optimal expansion condition, shown in FIGS. 2B and 2D, the outer surfaces of the individual elements combine to form a complete circle with no gaps in between the individual elements, and therefore the apparatus can be optimised for a specific diameter, to form a perfectly round expanded ring (within manufacturing tolerances). The ring structure provides a smooth, unbroken circumferential surface which may be used to engage a clutch surface. This may provide improved frictional contact.

Various modifications to the above-described embodiments may be made within the scope of the invention, and the invention extends to combinations of features other than those expressly claimed herein. In particular, the different embodiments described herein may be used in combination, and the features of a particular embodiment may be used in applications other than those specifically described in relation to that embodiment.

The invention claimed is:

1. A torque transfer apparatus comprising:
a plurality of elements assembled together to form a ring structure oriented in a plane around a longitudinal axis and defining a first engagement surface; and
a structure defining a second engagement surface, wherein the structure is rotatable with respect to the ring structure;
wherein the ring structure is operable to be moved between a collapsed condition and an expanded condition radially from the longitudinal axis by movement of the plurality of elements on imparting or releasing an axial force,
wherein, as part of moving between the collapsed and expanded conditions, adjacent elements slide along one another tangentially relative to a circle described around and concentric with the longitudinal axis, and
wherein movement between the collapsed condition and the expanded condition engages or disengages the first and second engagement surfaces.

2. The torque transfer apparatus according to claim 1 wherein the first and second engagement surfaces are engaged to transfer a driving torque between the ring structure and the rotatable structure.

3. The torque transfer apparatus according to claim 1, wherein the first and second engagement surfaces are configured to be engaged to transfer a braking torque therebetween.

4. The torque transfer apparatus according to claim 1, wherein the apparatus is normally collapsed, and is actuated to be expanded.

5. The torque transfer apparatus according to claim 1, wherein the apparatus is normally expanded, and is actuated to be collapsed.

6. The torque transfer apparatus according to claim 1, wherein the first engagement surface is an outer surface of the ring structure.

7. The torque transfer apparatus according to claim 6, wherein the first engagement surface is located at or on an expanded outer diameter of the ring structure.

8. The torque transfer apparatus according to claim 1, wherein the first engagement surface is an inner surface of the ring structure.

9. The torque transfer apparatus according to claim 8, wherein the first engagement surface is located at or on a collapsed inner diameter of the ring structure.

10. The torque transfer apparatus according to claim 1, wherein the first engagement surface is a conical surface.

11. The torque transfer apparatus according to claim 1, wherein each element of the ring structure comprises a first contact surface and second contact surface respectively in abutment with a first and second adjacent element.

12. The torque transfer apparatus according to claim 11, wherein the plurality of elements are configured to slide relative to one another along their respective contact surfaces.

13. The torque transfer apparatus according to claim 11, wherein the first contact surface and/or the second contact surface is oriented tangentially to a circle described around and concentric with the longitudinal axis.

14. The torque transfer apparatus according to claim 11, wherein the first contact surface and the second contact surface converge towards one another in a direction towards an inner surface of the ring structure.

15. The torque transfer apparatus according to claim 1, wherein at least some of the elements are provided with interlocking profiles for interlocking with an adjacent element.

16. The torque transfer apparatus according to claim 1, wherein an element is configured to interlock with a contact surface of an adjacent element.

17. The torque transfer apparatus according to claim 1, wherein elements forming the ring structure are mutually supportive in an operating condition of the apparatus.

18. The torque transfer apparatus according to claim 1, wherein when an operating condition of the apparatus is its expanded condition the ring structure is a substantially solid ring structure in its expanded condition.

19. The torque transfer apparatus according to claim 1, wherein the apparatus comprises at least one formation configured to impart a radial expanding or collapsing force component to the elements of the ring structure from an axial actuation force, wherein the at least one formation is configured to transmit torque to the ring structure.

20. The torque transfer apparatus according to claim 19, wherein the at least one formation comprises a splined arrangement.

21. The torque transfer apparatus according to claim 1, wherein the apparatus comprises a biasing means, configured to bias the ring structure to its collapsed condition or expanded condition.

22. A method of transferring torque between engagement surfaces using the apparatus claim 1.

23. A torque transfer apparatus comprising: a plurality of elements assembled together to form a ring structure oriented in a plane around a longitudinal axis and defining a first engagement surface; a structure defining a second engagement surface, wherein the structure is rotatable with respect to the ring structure; wherein the first engagement surface is a cylindrical surface; and wherein the ring structure is operable to be moved between first and second conditions to engage or disengage the first and second engagement surfaces,
wherein, as part of moving between the first and second conditions, adjacent elements of the ring structure slide along one another tangentially relative to a circle described around and concentric with the longitudinal axis.

24. The torque transfer apparatus according to claim 23, wherein the first and second engagement surfaces are engaged to transfer a driving torque between the ring structure and a rotatable member.

25. The torque transfer apparatus according to claim 23, wherein the first and second engagement surfaces are engaged to transfer a braking torque therebetween.

\* \* \* \* \*